(12) United States Patent
Fahimi et al.

(10) Patent No.: US 6,700,743 B2
(45) Date of Patent: Mar. 2, 2004

(54) TAPE MEDIA CLEANING/FINISHING DEVICE

(75) Inventors: Saeed A. Fahimi, Bloomington, MN (US); Richard E. Jewett, Minneapolis, MN (US); Allan R. Markert, Lake Elmo, MN (US); Durkee B. Richards, Sequim, WA (US)

(73) Assignee: Imation Corp., Oakdale, MN (US)

( * ) Notice: Subject to any disclaimer, the term of this patent is extended or adjusted under 35 U.S.C. 154(b) by 223 days.

(21) Appl. No.: 10/073,802

(22) Filed: Feb. 11, 2002

(65) Prior Publication Data

US 2003/0151853 A1 Aug. 14, 2003

(51) Int. Cl.[7] ............................................... G11B 5/008
(52) U.S. Cl. .................. 360/137; 15/DIG. 13
(58) Field of Search ................. 360/137, 128; 15/DIG. 13

(56) References Cited

U.S. PATENT DOCUMENTS

| | | |
|---|---|---|
| 4,331,993 A * | 5/1982 | Pfost et al. ................ 360/137 |
| 4,858,265 A | 8/1989 | Suzuki et al. |
| 5,045,962 A | 9/1991 | Inoue et al. |
| 5,349,713 A | 9/1994 | Stimpfl |
| 5,479,313 A | 12/1995 | Haba |
| 5,867,352 A | 2/1999 | Dohmen |
| 6,122,147 A | 9/2000 | Fahimi et al. |

* cited by examiner

Primary Examiner—Robert S. Tupper
(74) Attorney, Agent, or Firm—Eric D. Levinson

(57) ABSTRACT

A system and method for cleaning a tape media, such as a magnetic tape. The system preferably includes first and second cleaning heads. The first cleaning head has a plurality of spaced ridges defining a curved, tape-receiving face. The second cleaning head has including a plurality of lands spaced by shallow cavities configured to establish a sub-ambient condition. During use, a tape is transversed over the first cleaning head, with contact at leading edges formed by the ridges removing relatively large and loose particles. Relative to the second cleaning head, the tape partially wraps about a leading corner of the lands, due to the sub-ambient condition within the shallow cavities, facilitating removal of small, tacky debris. Processing by the cleaning heads simulates multiple passes over a magnetic head, thereby stabilizing magnetic tape. In alternative embodiments, the system includes only one of the first or second cleaning heads.

24 Claims, 9 Drawing Sheets

TAPE MEDIA CLEANING/FINISHING DEVICE

BACKGROUND OF THE INVENTION

The present invention relates to a device for removing debris from a surface of a tape media. More particularly, it relates to an on-line or off-line tool capable of removing both loose and adherent debris from a media tape, preferably a magnetic tape, via a multi-slotted cleaning head and/or a negative pressure multi-cavity cleaning head.

Tape media, such as magnetic tape, is used for a wide variety of applications, including data storage. For data storage, servo-write applications, a very precise magnetically encoded pattern is placed on a front surface of the tape that otherwise interfaces with a magnetic or servo-writing head during use. Any debris carried by the magnetic tape (loose or more permanently adhered) can contaminate the servo-writing head, possibly disturbing a requisite spacing between the head and the tape. This, in turn, may lead to reading and/or writing errors. As such, it is highly desirable to remove as much debris as possible from the magnetic tape either during initial manufacture and/or during use. Other forms of tape media (e.g., optical tape) present similar cleaning and/or finishing concerns.

Specialized cleaning tapes have been developed that can be periodically employed to hopefully clean an otherwise contaminated head. Unfortunately, a user may forget to utilize the cleaning tape/cartridge or the cleaning tape may not effectively remove all debris. A more preferred solution is to remove debris from the magnetic tape itself prior to interaction with the head. In particular, because most unwanted debris is generated during the tape manufacturing process, a magnetic tape cleaning device is preferably implemented as part of the manufacturing process.

Currently available techniques for removing debris from magnetic tape are relatively limited and rudimentary. A first approach entails wiping the storage tape with a roughened woven or non-woven fabric. While the fabric undoubtedly removes some debris, the cleaning effects are less than complete. Alternatively, sapphire blades or scrapers are used to dislodge loose debris particles from the magnetic tape. In general terms, these sapphire-based devices are typically triangular in geometry, with each corner providing a blade-like surface(s) that scrape or abrade the magnetic tape as it wrapped about the piece. In either case, the technique is not well understood and is specifically directed toward removing loose debris only. Finally, relative to the sapphire scraper, the tool itself has been found to impart undesirable scratches or nicks onto the tape.

Conversely, some tape manufacturers employ a magnetic tape finishing process that may have some cleansing or debris removal implications. This approach of finishing magnetic tape for data storage applications entails passing the magnetic tape over an existing, but non-functioning, magnetic head. The magnetic head is selected to correspond with a particular final application, and is thus commonly referred to as a "dummy" head. The effectiveness, price, availability, and selection of these dummy heads are not well known. As a point of reference, it has been found that following 20–30 passes over a magnetic head, a newly manufactured data storage magnetic tape has lower output error rates, and is thus more "stable". Thus, the design goal of the dummy head finishing process is to achieve a stable, low spacing and possible light asperity contact between the dummy head and the magnetic tape, but is not specifically provided to remove debris. Instead, the dummy head finishing technique attempts to impart a final "finish" to the magnetic tape, whereby any attached particles/debris slightly are polished. Notably, the previously-described fabric wiping or blade scraping techniques do not seek to replicate this beneficial stabilizing effect.

Tape media, for example magnetic tape, continues to be a highly viable tool for diverse applications, including recording and retrieving data. Though the materials used for magnetic tapes continue to evolve, the available techniques for cleaning debris from the tape and/or magnetic tape finishing operations have essentially remained unchanged. Therefore, a need exists for a cleaning tool that consistently removes both loose and more permanently attached particles, and simulates multiple passes over a magnetic head to "finish" or stabilize the magnetic tape itself.

SUMMARY OF THE INVENTION

One aspect of the present invention relates to a magnetic tape cleaning device comprising a head having a front. A plurality of transverse slots (e.g., substantially perpendicular to tape travel) are formed in the front of the head to define a plurality of spaced ridges. Each of the ridges has an outer surface extending between opposing transverse edges. With this configuration, the outer surfaces combine to define a curved, tape-receiving face. As a tape media is driven along the tape-receiving face in a generally perpendicular fashion relative to the transverse edges, the tape intimately contacts a leading transverse edge of at least three ridges. In particular, the so-contacted leading edge serves as a scraping or cutting surface relative to the direction of tape travel. This intimate contact effectuates removal of debris. In one preferred embodiment, the head includes at least ten of the transverse slots, each having a depth in the range of 0.005–0.02 inch. In another preferred embodiment, the outer surfaces of the ridges combine to define a uniform radius of curvature in the range of 5–20 mm.

Another aspect of the present invention relates to a method of removing debris from a tape media. The method includes providing a cleaning head having a front and a plurality of transverse slots formed in the front. The slots define a plurality of spaced ridges each having an outer surface extending between opposing transverse edges. Further, the outer surfaces combine to define a curved, tape-receiving face. The tape is driven across the face in a generally perpendicular fashion relative to the transverse edges such that a transverse chordal segment of the tape intimately contacts a leading transverse edge of at least three of the ridges with the leading edge of each ridge being defined by the direction of tape travel. This driven contact between the tape and the transverse edges results in debris being removed from the tape. In one preferred embodiment, the method of removing debris is performed within a data storage tape cartridge. In another preferred embodiment, the method of removing debris is performed as part of a magnetic tape manufacturing process.

Yet another aspect of the present invention relates to a tape media cleaning device comprising a head defined by opposing outer regions and a central region. A plurality of transverse cavities are formed in the front to define a plurality of lands in the central region. Each of the lands has an outer face extending between opposing sides, with opposing corners being formed at an intersection between the outer face and the opposing sides, respectively. Further, the head includes first and second outriggers formed at the opposing outer regions, respectively. In this regard, each of the outriggers are spaced from a corresponding, adjacent land. With the above construction, the plurality of cavities are configured to establish a sub-ambient condition as a tape is driven across the outer faces in a generally perpendicular fashion relative to the lands. As a result, the tape at least partially wraps about a leading corner of at least three of the lands, thereby effectuating removal of debris. In one preferred embodiment, the head includes at least four of the lands. In another preferred embodiment, the plurality of cavities includes opposing outer cavities separating the respective outriggers from an adjacent one of the lands, along with central cavities separating the lands and adapted to generate the intended negative pressure effect. With this in mind, each of the central cavities preferably has a depth in the range of 1–10 microns. In another preferred embodiment, the cleaning device further includes a block maintaining the head, with the block being configured to selectively dictate a tape penetration position of the head relative to a magnetic tape.

Yet another aspect of the present invention relates to a method of removing debris from a tape media. The method includes providing a cleaning head having a front defined by opposing outer regions and a central region. A plurality of transverse cavities are formed in the front to define a plurality of lands in the central region. In this regard, each of the lands has an outer face extending between opposing corners. Finally, the cleaning head defines opposing outriggers formed at the opposing outer regions, respectively. A tape is driven across the outer faces in a generally perpendicular fashion relative to the lands such that a transverse chordal segment of the magnetic tape is passed over at least three of the lands. A sub-ambient condition is established within at least three of the cavities during the step of driving the tape such that the tape at least partially wraps about a leading corner of at least three of the lands, with the leading corner of each land being defined by the direction of tape travel. In this regard, the driven contact between the tape and the leading corners about which the tape is at least partially wrapped effectuates removal of debris. In one preferred embodiment, the tape is driven in a back-and-forth fashion across the outer faces.

Another aspect of the present invention relates to a tape media cleaning system including a first cleaning device and a second cleaning device. The first cleaning device includes a first cleaning head having a front within which a plurality of transverse slots are formed to define a plurality of spaced ridges. Each of the spaced ridges has an outer surface extending between opposing transverse edges. In this regard, the outer surfaces combine to define a curved, tape-receiving face configured such that a tape driven along the tape-receiving face in a generally perpendicular fashion relative to the transverse edges intimately contacts a leading transverse edge of at least three of the ridges to effectuate removal of debris. The second cleaning device is associated with the first cleaning device and includes a second cleaning head having a front defined by opposing outer regions and a central region. A plurality of transverse cavities are formed in the front of the second cleaning head to define a plurality of lands in the central region, each having an outer face extending between opposing sides. Further, each of the lands define opposing corners at an intersection between the outer face and the opposing sides, respectively. Finally, the second cleaning head includes first and second outriggers formed at the opposing outer regions, respectively. Each of the outriggers are spaced from a corresponding, adjacent land. The construction of the second cleaning device is such that the plurality of cavities establish a sub-ambient condition as a tape is driven across the outer faces in a generally perpendicular fashion relative to the lands, such that the tape at least partially wraps about a leading corner of at least three of the lands to effectuate removal of debris. In one preferred embodiment, the cleaning system further includes a feeding mechanism configured to drive a magnetic tape across the tape-receiving face of the cleaning first head and the lands of the second cleaning head as part of a magnetic tape manufacturing process.

Yet another aspect of the present invention relates to a method of cleaning a tape media. The method includes providing a first cleaning head having a front and a plurality of transverse slots formed therein to define a plurality of spaced ridges. Each of the ridges has an outer surface extending between opposing transverse edges. Further, the outer surfaces combine to define a curved, tape-receiving face. A second cleaning head is also provided. The second cleaning head has a front defined by opposing outer regions and a central region. A plurality of transverse cavities are formed in the front to define a plurality of lands in the central region, each having an outer face extending between opposing corners. Finally, the second cleaning head includes opposing outriggers formed at the opposing outer regions, respectively. A tape is driven across the tape-receiving face of the first cleaning head in a generally perpendicular fashion relative to the transverse edges such that a transverse chordal segment of the tape intimately contacts a leading transverse edge of at least three of the ridges. Further, the tape is driven across the second cleaning head in a generally perpendicular fashion relative to the lands such that the transverse chordal segment is passed over at least three of the lands. In this regard, a sub-ambient condition is established within at least three of the cavities associated with the second cleaning head such that the tape at least partially wraps about a leading corner of the at least three lands. Finally, debris is removed from the tape via the driven contact between the magnetic tape and the leading transverse edges of the first head, as well as between the tape and the leading corner of the second head about which the tape is at least partially wrapped. In one preferred embodiment, the method includes simulating multiple passes over a magnetic head as a magnetic tape is driven across the first and second cleaning heads.

DESCRIPTION OF THE PREFERRED EMBODIMENTS

Figure 1:
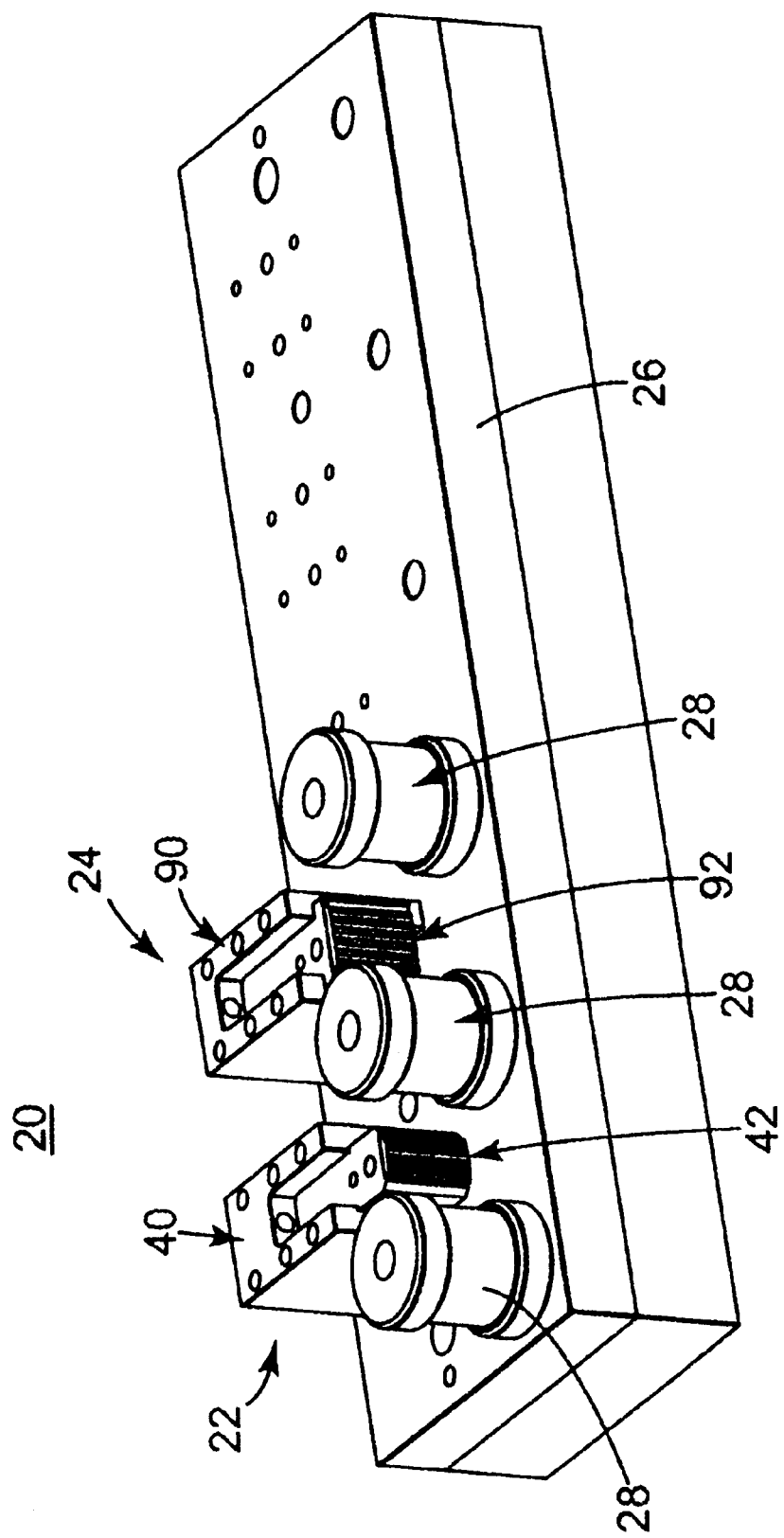
FIG. 1 is a perspective view of a tape media cleaning system in accordance with the present invention.

One preferred embodiment of a tape media cleaning system 20 is provided in FIG. 1. The cleaning system 20 can be used to clean/finish a variety of different types of tape (e.g., magnetic data storage tape, optical data storage tape, etc.), and includes a first cleaning device 22 and a second cleaning device 24. The first and second cleaning devices 22, 24 are preferably maintained by a support structure 26 in relatively close proximity to one another. Further, the support structure 26 maintains tape guides or rollers 28 that are otherwise positioned to define a tape path for a tape media (not shown) to interact with the first and second cleaning devices 22, 24. As will be made more clear below, arrangement of the first and second cleaning devices 22, 24 provided in FIG. 1 is but one possible construction of the cleaning system 20. To this end, while the cleaning system 20 is illustrated as preferably including one of the first cleaning devices 22 and one of the second cleaning devices 24, any other number is equally acceptable. Alternatively, the cleaning system 20 can be comprised of only the first cleaning device 22 or the second cleaning device 24. Further, the tape guides 28 illustrated in FIG. 1 are but one example of appropriate components for defining a desired tape path. Also, the cleaning system 20 can include additional components (not shown), such as a tape feeding mechanism, a vacuum shroud, etc.

With the above in mind, the first cleaning device 22 preferably includes a control block 40 maintaining a cleaning head 42. The control block 40 can assume a wide variety of forms, but is preferably configured to selectively position the cleaning head 42 at a desired location. In particular, the control block 40 is preferably adapted to move (such as by a servo-motor (not shown)) the cleaning head 42 closer to and away from the tape guides 28 associated with the first cleaning device 22. In this way, the control block 40 selectively dictates a tape penetration position of the cleaning head 42 relative to a magnetic tape (not shown) being cleaned. Alternatively, the cleaning system 20 can be adapted such that movement of the cleaning head 42 is not necessary such that the control block 40 can assume a wide variety of forms, or can be eliminated entirely.

Figure 2:
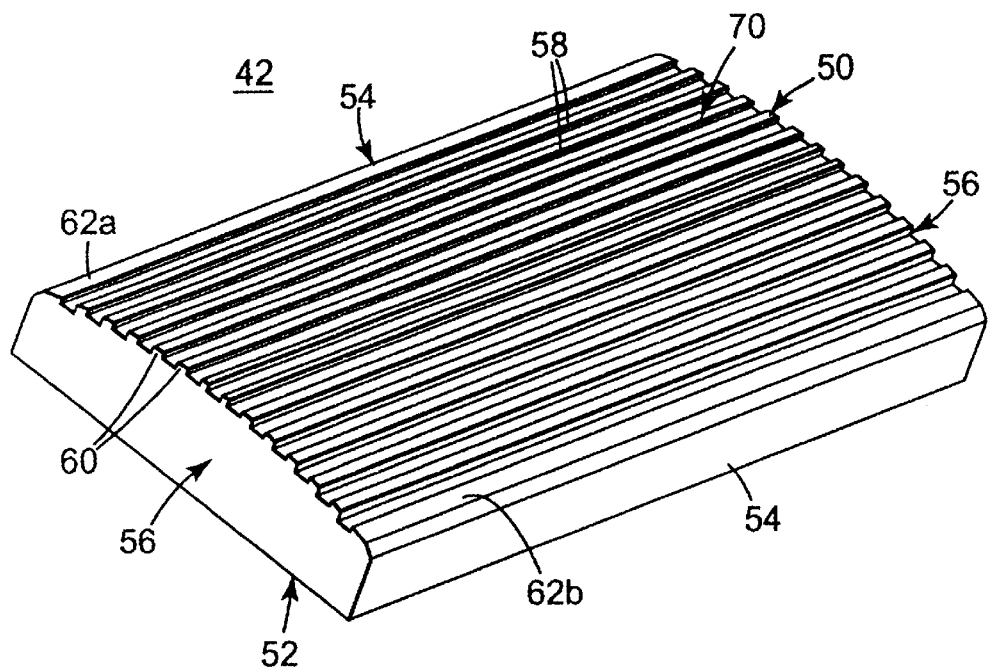
FIG. 2 is an enlarged, perspective view of a first cleaning head associated with the system of FIG. 1.

The cleaning head 42 is shown in greater detail in FIG. 2. The cleaning head 42 is preferably provided as a uniform material block defining a front 50, a back 52 (referenced generally in FIG. 2), opposing sides 54, and opposing ends 56. As a point of reference, directional terminology such as "front," "back," etc., are with reference to a preferred orientation of the cleaning head 42 relative to a tape (not shown) during use. That is to say, the cleaning head 42 is positioned such that during use, the front 50 interacts with the tape.

With the above designations in mind, a plurality of transverse slots 58 are formed in the front 50 of the cleaning head 42, thereby defining a plurality of ridges 60. With the embodiment of FIG. 2, the slots 58 extends along an entire lateral length or height of the cleaning head 42. Alternatively, the slots 58 can only encompass a portion of the front 50, but preferably have a length greater than a transverse width of a tape (not shown) to be processed by the cleaning head 42. Regardless, in a preferred embodiment, the cleaning head 42 further forms opposing transition regions 62a, 62b along the front 50 and opposing sides 54. As described in greater detail below, the transition region 62a, 62b are preferably contoured or polished to facilitate a desired tape wrap about the cleaning head 42.

Figure 3:
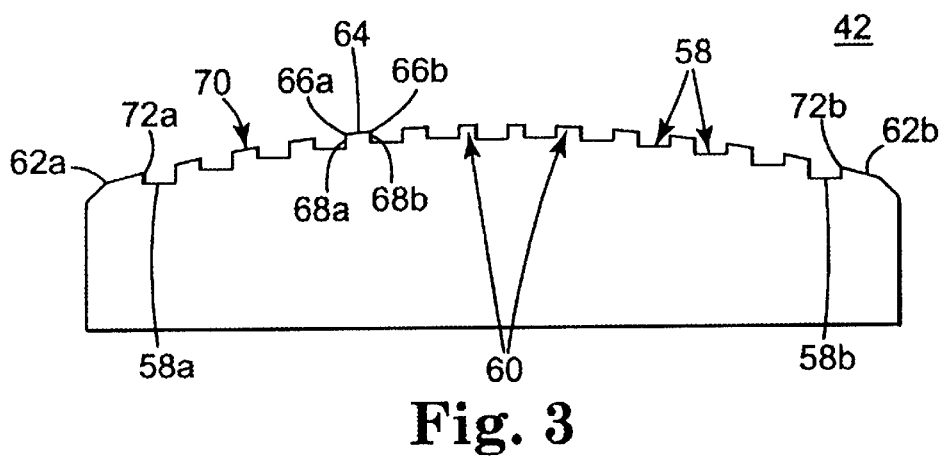
FIG. 3 is an enlarged, side view of the head of FIG. 2.

With additional reference to FIG. 3, each of the slots 58 are uniformly formed in the cleaning head 42 such that each of the ridges 60 is defined by an outer surface 64, opposing edges 66a, 66b, and opposing sides 68a, 68b. The outer surfaces 64 of the ridges 60 combine to define a curved, tape-receiving face 70 (referenced generally in FIGS. 2 and 3) for the cleaning head 42. In a preferred embodiment, the tape-receiving face 70 is a uniform arc, having a radius of curvature in the range of 5–20 mm, more preferably 12.5 mm. Notably, the contoured surface associated with the transition regions 62a, 62b corresponds with this preferred curvature. As described in greater detail below, the preferred curved nature of the tape-receiving face 70 facilitates desired tape interaction with the ridges 60 during use. In fact, the preferred radius of curvature range has surprisingly been found to produce optimal results relative to cleaning/finishing of magnetic data storage tape. Alternatively, the tape-receiving face 70 can define a compound curve and/or may include relatively flat or linear (in transverse cross-section) portions.

In a preferred embodiment, the cleaning head 42 includes at least three of the ridges 60 in addition to the opposing transition regions 62a, 62b. Thus, in a preferred embodiment, at least five of the slots 58 are provided. More preferably, the cleaning head 42 includes at least ten of the slots 58. In an even more preferred embodiment, thirteen of the slots 58 are formed in the cleaning head 42 resulting in twelve of the ridges 60 along with the opposing transition region 62a, 62b. Notably, the slots 58 formed adjacent the opposing transition regions 62a, 62b (referenced in FIG. 3 as the slots 58a, 58b) preferably define a transverse edge 72a, 72b at each of the transition regions 62a, 62b, respectively. As described in greater detail below, the transverse edges 66, 72a, 72b can serve to remove debris from a tape media during a cleaning operation. As such, the transition regions 62a, 62b essentially serve a similar function to the ridges 60 such that the most preferred configuration of FIGS. 2 and 3 can be referenced as providing fourteen of the ridges 60.

Regardless of the number of slots 58 and/or ridges 60, each of the slots 58 are preferably configured such that, in combination with curved, tape-receiving face 70 described above, a sub-ambient condition will not be generated within the slots 58 when a tape (not shown) is driven or passed over the tape-receiving face 70 at typical operational speeds. In particular, the slots 58 are formed to a specific depth and specific width such that as a tape is transversed over the slots 58, the air pressure within each slot 58 is generally at ambient. With respect to a depth of each of the slots 58, it will be noted that due to the curved nature of the tape-receiving face 70, each slot 58 will have a varying depth. In other words, each slot 58 defines a first side 68a of a first ridge 60 and a second side 68b of a second ridge 60, with one of these sides 68a or 68b being taller than the other. As such, each of the slots 58 is defined by a "minimum" depth that corresponds with the smaller of the two sides 68a or 68b defined by the slot 58. With this in mind, each of the slots 58 has a minimum depth in the range of 0.005–0.015 inch, more preferably 0.01 inch. Further, each of the slots 58 preferably has a transverse width in the range of 0.005–0.020 inch, more preferably 0.012 inch. These preferred dimensional constraints have surprisingly been found to produce optimal cleaning/finishing effects relative to processing of magnetic data storage tape. Regardless of exact dimensions, it is preferred that the slots 58 be uniformly formed.

As illustrated best in FIG. 3, each of the slots 58 are preferably formed to define the various edges 66a, 66b associated with the ridges 60 as corners. With this configuration, the opposing edges 66a, 66b of each of the ridges 60 provide a relatively sharp corner for intimately contacting a tape (not shown). In this regard, a linear width of the outer surface 64 associated with each of the ridges 60 can vary, but preferably provides sufficient surface area for receiving the tape to be processed. In one preferred embodiment, the width of the outer surfaces 64 is less than a transverse width of the slots 58. In a more preferred embodiment, a transverse width of each of the ridges 60 in combination with a width of the slots 58 provides a slot-to-slot width in the range of 0.008–0.028 inch, more preferably 0.018 inch. Alternatively, other dimensions are acceptable.

The transition regions 62a, 62b essentially serve as outriggers, dictating a desired wrap angle about the tape-receiving face 70. In one preferred embodiment, the transition regions 62a, 62b are contoured, having a radius of curvature of approximately 0.006 inch. Other dimensions or design variations are also acceptable.

The cleaning head 42 is formed from a hardened material, preferably selected to simulate a device the tape media (not shown) will otherwise interact with during use. Thus, where the tape is a magnetic tape to be employed in a data storage application, the cleaning head 42 is preferably formed from a block of $Al_2O_3$—TiC material, similar to available magnetic servo-write heads. With this one preferred material, the slots 58 are formed by an ion milling or focused ion-beaming operation. Alternatively, other materials and/or manufacturing techniques are acceptable.

Figure 4A:
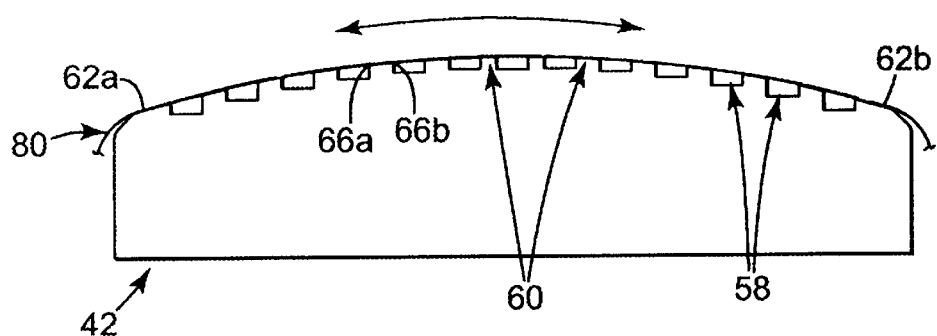
FIG. 4A is a side view of the first cleaning head in conjunction with a tape media.

Use of the cleaning head 42 to remove debris from a tape media 80 is shown in FIG. 4A. The tape 80 is preferably magnetic data storage tape, available, for example, from Imation Corp., of Oakdale, Minn., but can alternatively be any type of tape that benefits from the cleaning and/or finishing effects of the present invention. During use, the tape 80 is driven across the tape-receiving face 70 in a generally perpendicular fashion relative to the transverse slots 58. In this regard, the tape 80 can be driven in one direction, or back-and-forth (as indicated by arrows in FIG. 4A). As the tape 80 is driven across the tape-receiving face 70, the tape 80 intimately contacts one of the edges 66a, 66b of each of the ridges 60. For example, relative to the orientation of FIG. 4A, where the tape 80 is driven from left to right, the tape 80 will intimately contact the left edge 66a of each of the ridges 60, such that the edge 66a serves a leading edge that provides a scraping or cutting surface against the tape 80. Where the direction of tape travel is reversed (i.e., right to left), the other edges 66b will intimately contact the magnetic tape 80 as previously described, and thus serves as the "leading" edge. Regardless, this driven, intimate contact results in the respective edge 66a, 66b scraping or shaving undesirable debris from the tape 80. As previously described, the slots 58 are sufficiently sized so that an air pressure below the tape 80 at each of the slots 58 is always approximately ambient. That is to say, a sub-ambient condition will not be established within the slots 58 as the tape 80 is traversed across the face 70.

The removed debris preferably falls into the corresponding slot 58. The slots 58 can be periodically cleaned of accumulated debris and/or the cleaning head 42 can be maintained within a vacuum environment (e.g., a shroud) that effectuates dislodgement of debris from the slots 58. Regardless, by providing a plurality of the ridges 60, and thus a plurality of "hard" surface contacts with the tape 80, the cleaning head 42 rapidly removes debris from the magnetic tape 80. Further, relative to the tape 80 preferably being data storage tape (magnetic optical, etc.), the plurality of "hard" surface contacts simulates multiple passes of the tape 80 over a head. As previously described, it has been found that newly manufactured magnetic data storage tape is typically more "stable" following multiple passes over a magnetic head during use. Thus, in addition to removing unwanted debris, the cleaning head 42 serves to stabilize the magnetic tape 80.

Figure 4B:
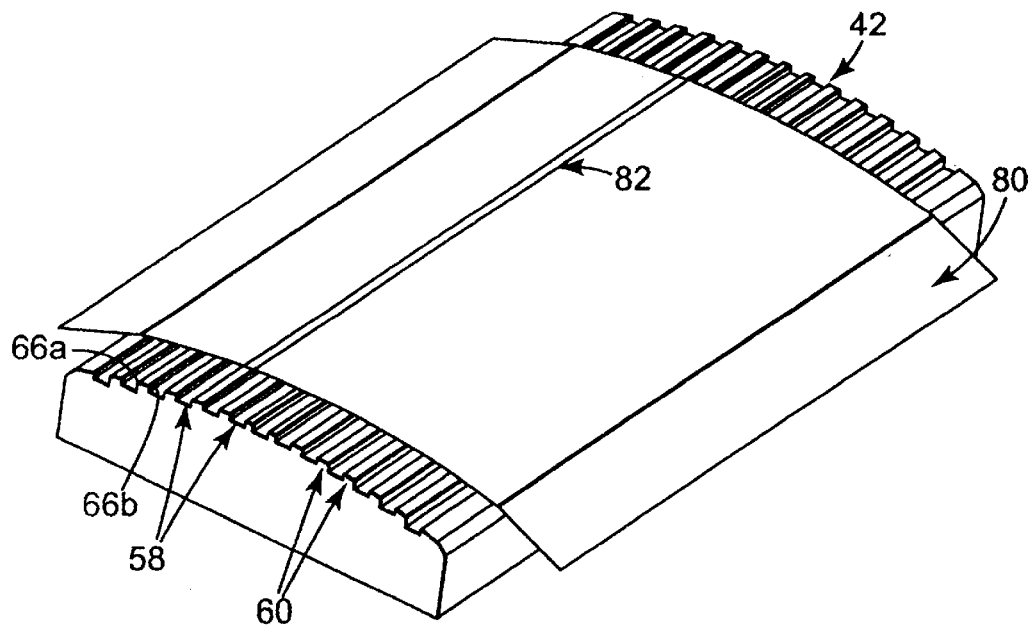
FIG. 4B is a perspective view of FIG. 4A.

As previously described, while the preferred cleaning head 42 is formed to include twelve of the ridges 60 along with the opposing transition regions 62a, 62b, a variety of other slot/ridge designs can be employed. Preferably, however, the cleaning head 42 is configured such that at least three of the ridges 60 are provided. Stated otherwise, and with additional reference to FIG. 4B, the tape 80 can be described as having a continuous series of transverse chordal segments 82 (one of which is illustrated in FIG. 4B, it being recognized that the lines in FIG. 4B otherwise delineating the chordal segment 82 do not physically exist on the tape 80). The cleaning head 42 is preferably configured such that as the tape 80 is driven over the tape-receiving face 70, the transverse chordal segment 82 intimately contacts the leading edge 66a or 66b of at least three ridges 60, whereby "intimate contact" is in reference to the leading edge 66a or 66b scraping the tape 80. Conversely, while more than thirteen of the slots 58 can be formed, it has surprisingly been found that more than thirteen slots may cause cohesive failures in magnetic tape 80 due to the increased tape tension required to pull the magnetic tape 80 across the cleaning head 42.

Figure 5:
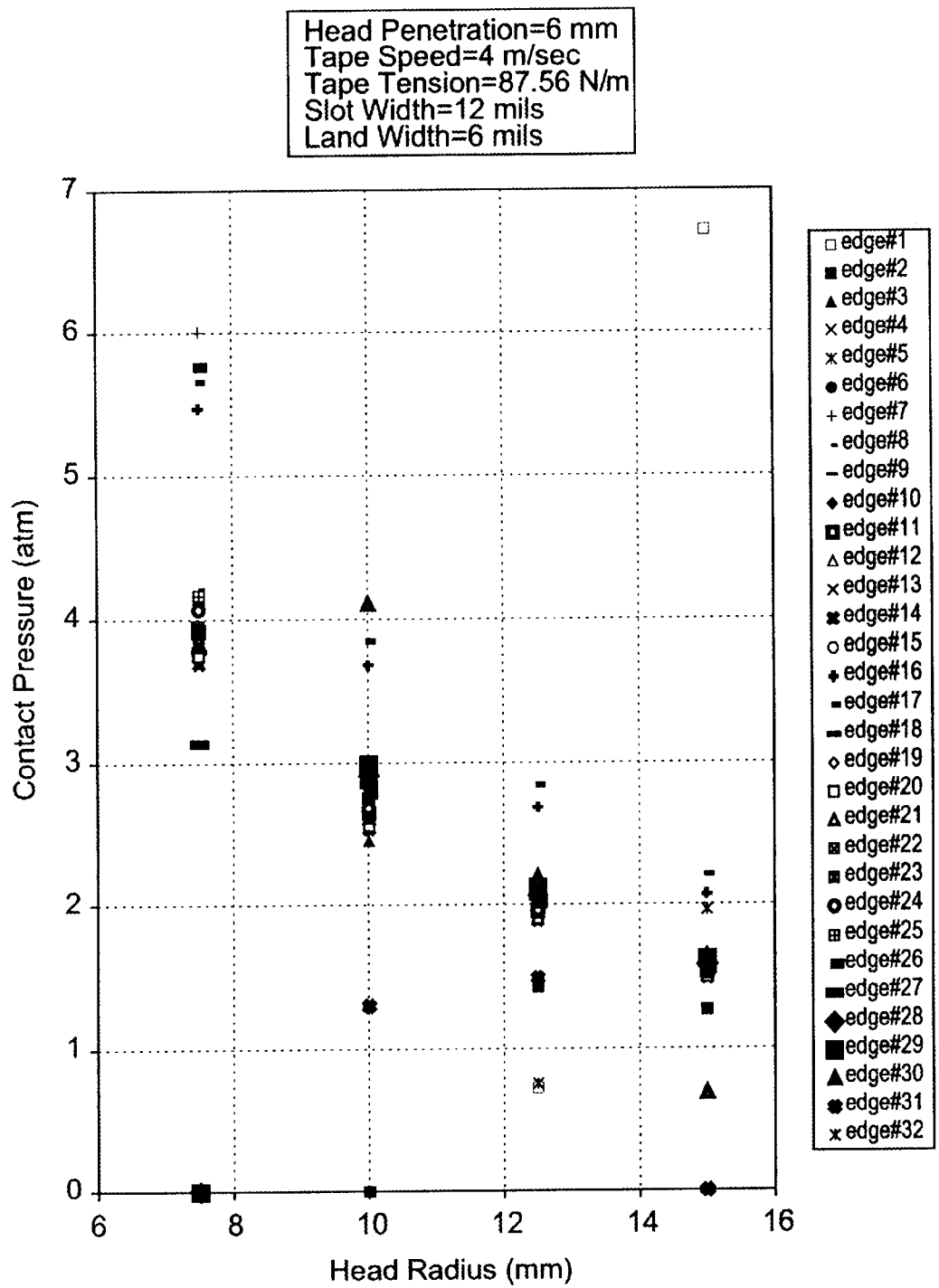
FIG. 5 is a graphical illustration of contact pressure across the cleaning head of FIG. 2 at different head radii.
Figure 6:
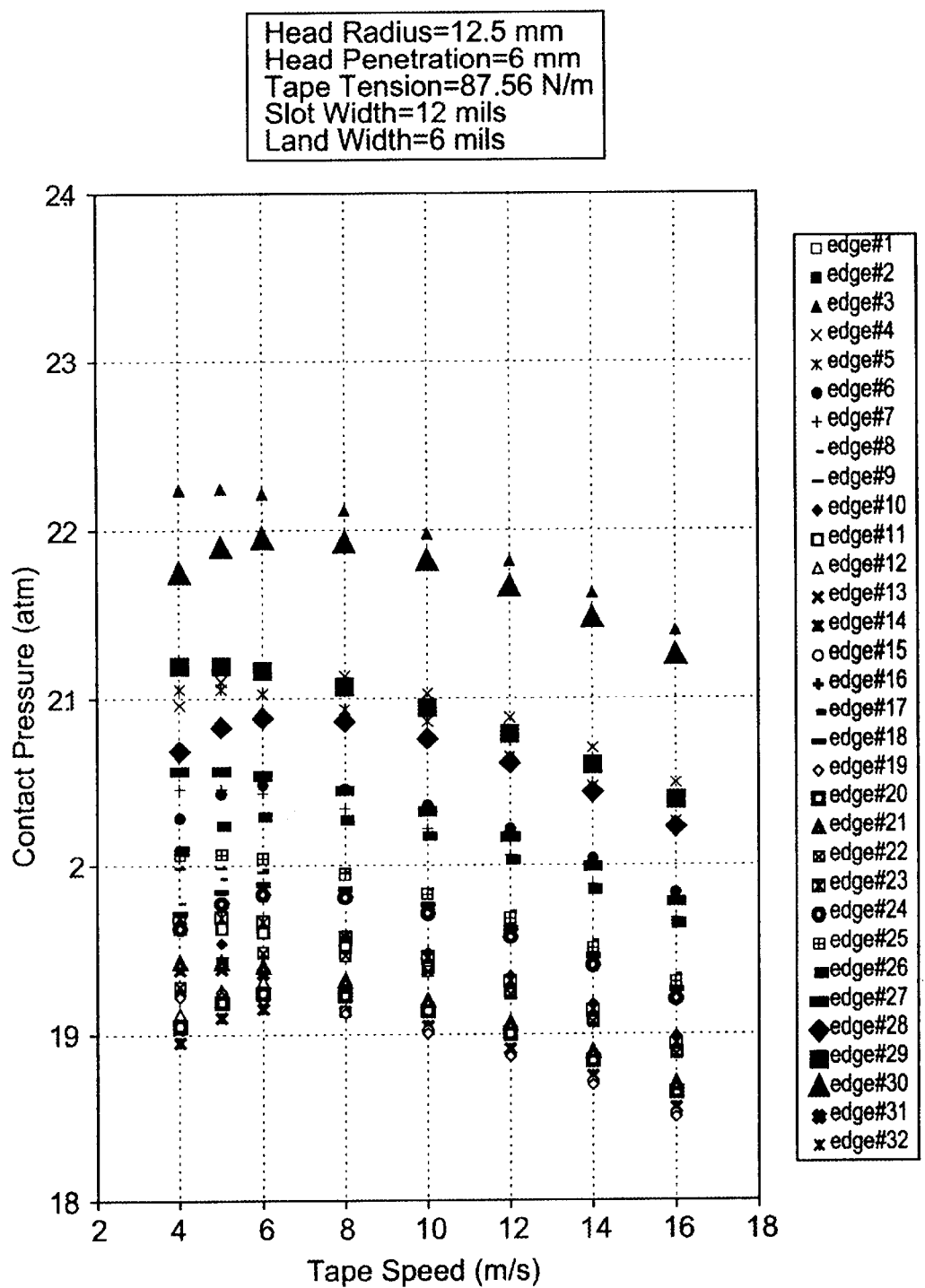
FIG. 6 is a graphical illustration of contact pressure across the cleaning head of FIG. 2 at different tape speeds.

The above-described cleaning head 42 is capable of effectuating desired debris removal and tape stabilization at a variety of tape speeds (e.g., in the range of 4–20 meters/second). Notably, it has surprisingly been found that the contact pressure at the edges 66a, 66b is primarily a function of the radius of curvature defined by the tape-receiving face 70 as exemplified by FIG. 5 which illustrates the edge contact pressure (vertical axis) of a magnetic data storage tape driven across a preferred cleaning head 52 having sixteen ridges at varying radius of curvature (horizontal axis) designs. Each slot had a transverse width of 12 mils, and each ridge has a transverse width of 6 mils. It has further been found that a width of the slots 58 plays a minor role in the resulting contact pressure. Conversely, tape speed across the tape-receiving face 70 has been found to have little impact on the edge contact pressure, as illustrated in FIG. 6 that otherwise plots contact pressure (vertical axis) of a magnetic data storage tape at each edge of the sixteen ridge cleaning head 42 previously described with respect to FIG. 5.

Returning to FIG. 1, the second cleaning device 24 includes a control block 90 and a cleaning head 92. The control block 90 is virtually identical to the control block 40 previously described and is provided to selectively dictate a desired position of the cleaning head 92 relative to a tape (not shown). The cleaning head 92, however, is configured to generate a sub-ambient or negative pressure relative to the tape during a cleaning operation to effectuate debris removal.

Figure 7:
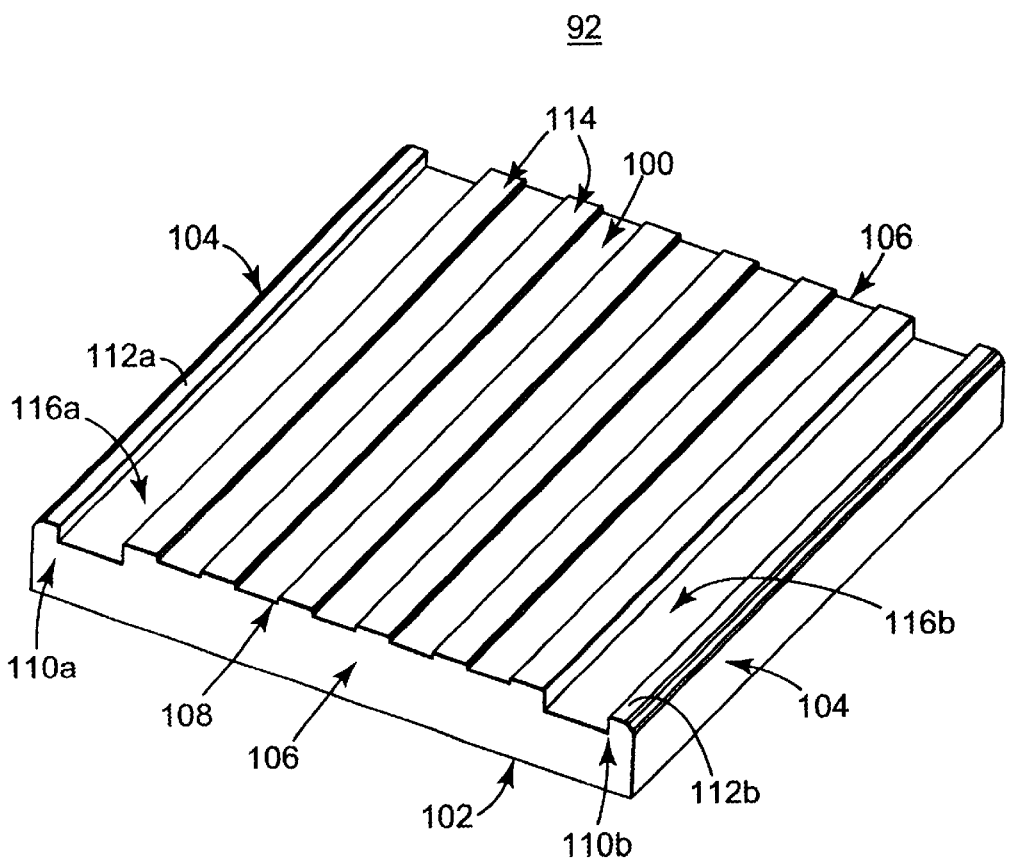
FIG. 7 is a perspective view of a second cleaning head associated with the system of FIG. 1.

One preferred embodiment of the cleaning head 92 is shown in greater detail in FIG. 7. The cleaning head 92 is preferably an integrally formed block of material formed to define a front 100, a back 102, opposing sides 104, and opposing ends 106. In this regard, the front 100 defines a central region 108 and opposing outer regions 110a, 110b. The cleaning head 92 forms an outrigger 112a, 112b at each of the outer regions 110a, 110b, along with a plurality of transverse lands 114 in the central region 108. An outer transverse cavity 116a, 116b is formed in each of the outer regions 110a, 110b, separating the outriggers 112a, 112b from a corresponding, adjacent land 114. Further, each of the lands 114 are separated from one another by central cavities 118.

Figure 8:
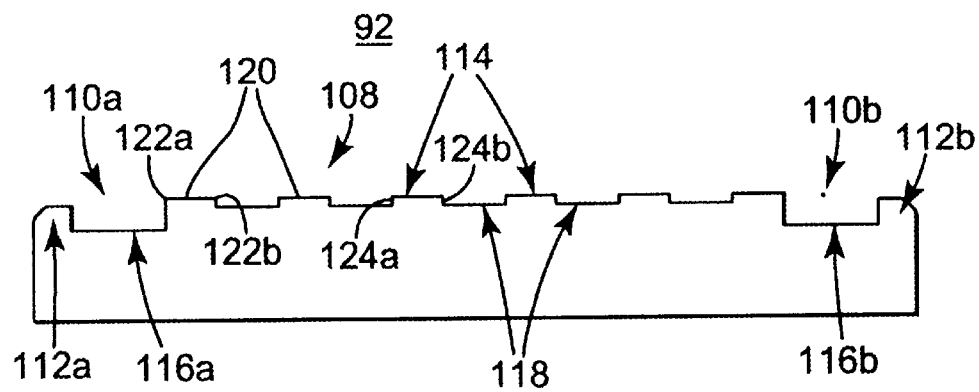
FIG. 8 is an enlarged, side view of the second cleaning head of FIG. 7.

With additional reference to FIG. 8, each of the lands 114 includes an outer surface 120, opposing corners 122a, 122b, and opposing sides 124a, 124b. The outer surfaces 120 are adapted to receive a tape (not shown), and are preferably highly flat or linear in transverse cross-section. For example, the outer surfaces 120 of the lands 114 are preferably formed to have a flatness of less than about 200 nanometers and a surface roughness of less than about 200 nanometers (average peak height). Further, the outer surfaces 120 are co-planar. As described below, this flat, co-planar construction, in combination with a preferred construction of the central cavities 118, facilitates desired bending or wrapping of a tape (not shown) about one of the corners 122a, 122b during a cleaning operation as described below.

The desired interaction between a tape (not shown) and one of the corners 122a, 122b is provided by configuring each of the central cavities 118 to have a depth and width that establishes a sub-ambient or negative pressure condition as the tape is traversed over the outer surfaces 120. The magnitude of the sub-ambient condition must be sufficient to deform or bend the tape as it traverses each of the central cavities 118. In this regard, each of the central cavities 118 is formed to define a depth preferably in the range of 1–10 microns, more preferably 2 microns. These dimensional constraints have surprisingly been found to produce optimal cleaning/finishing effects relative to magnetic data storage tape. Further, each of the central cavities 118 has a transverse width in the range of 0.5–2 mm, more preferably 1 mm. With these preferred dimensions in mind, the lands 114 preferably have a transverse width in the range of 0.5–2 mm, more preferably approximately 0.8 mm.

The outer cavities 116 are preferably larger (in terms of depth and width) than the central cavities 118 and serve as bleed slots, whereby air pressure within the outer cavities 116 is substantially at ambient when a tape (not shown) is passed over the outer cavities 116. Thus, the outer cavities 116 both have a depth of at least about 0.1 mm (0.004 inches), most preferably about 0.5 mm (0.02 inch) and a width of about 1.5 mm (0.06 inch).

The outer regions 110a, 110b, and in particular the outriggers 112a, 112b, are provided to generate a preferred tape angle or wrap relative to the lands 114. Thus, the outriggers 112a, 112b preferably extend to a height less than that of the lands 114, and provide a contoured surface for guiding a tape (not shown) across the cleaning head 92. For example, in one preferred embodiment, the outriggers 112a, 112b define a radius of about 6–8 mm.

In the most preferred embodiment, the cleaning head 92 is configured to provide six of the lands 114, and thus includes five of the central cavities 118. Alternatively, other numbers are acceptable. Preferably, however, at least three of the lands 114 are included so that the cleaning head 92 efficiently cleans and stabilizes the tape (not shown).

Figure 9:
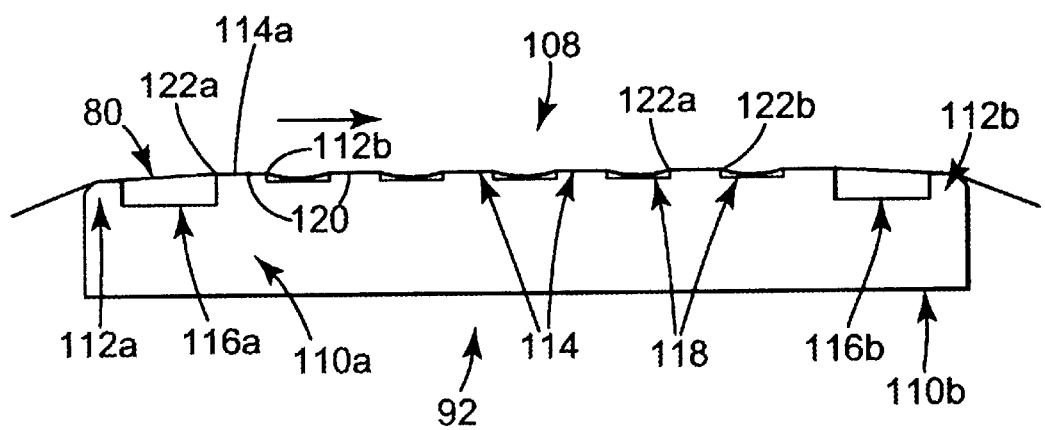
FIG. 9 is a side view of the second cleaning head in conjunction with a tape media.

The cleaning head 92 is shown in conjunction with the tape 80 during a cleaning operation in FIG. 9. Once again, the tape 80 is preferably a magnetic data storage tape, but can alternatively assume a variety of other forms. The tape 80 is driven across the front 100 of the cleaning head 92 in a generally perpendicular fashion relative to the lands 114. In this regard, the cleaning system 20 (FIG. 1) is preferably configured to drive the tape 80 in either direction relative to the lands 114 (i.e., to the left or to the right relative to the orientation of FIG. 9). As a point of reference, the tape 80 is being driven from left to right in the view of FIG. 9. As the tape 80 is driven across the front 100, a sub-ambient or negative pressure is generated within each of the central cavities 118. In particular, due to the depth, length, and width of the outer cavity 116a, the air pressure below the tape 80 at the outer cavity 116a is generally at ambient. Air entrained at the bottom of the tape 80 is obstructed at the corner 122a of the first land 114a. This phenomenon creates a reduced pressure condition in the region corresponding with the outer surface 120 of the first land 114a. Because the first central cavity 118a is relatively shallow, the reduced pressure condition continues through the first central cavity 118a. The negative pressure condition is maintained throughout each of remaining lands 114 and corresponding central cavities 118. The self-generating, sub-ambient condition is created across the central region 108 by movement of the tape 80. Finally, as the tape 80 progresses to the outer cavity 116b, an ambient condition is re-established both above and below the magnetic tape 80.

Due to the above-described sub-ambient condition with the central region 108, the tape 80 deforms or bends into the central cavities 118 and at least partially wraps about one of the corners 122a, 122b of at least some of the lands 114. The direction of tape travel across the cleaning head 92 effectively designates the corners 122a, 122b as either a leading corner or a trailing corner. For example, with left to right tape travel, the corners 122a are leading corners and the corners 122b are trailing corners. The tape 80 at least partially wraps about the leading corners (e.g., in FIG. 9, the corner 122a of the lands 114). This partial wrap provides relatively aggressive, intimate contact between the tape 80 and the corresponding corner 122a or 122b, such that the cleaning head 92 is capable of removing relatively minute and/or tacky material from the tape 80.

The cleaning head 92 is preferably constructed of an extremely hard material, preferably simulating the device(s) a magnetic tape 80 will interact with during use. Thus, where the tape 80 is a magnetic tape to be used for data storage applications, the cleaning head 92 is preferably made from a hard magnetic head material such as Al—TiC ($Al_2O_3$—TiC). The cavities 116, 118 are preferably formed by an ion milling operation.

Figure 10:
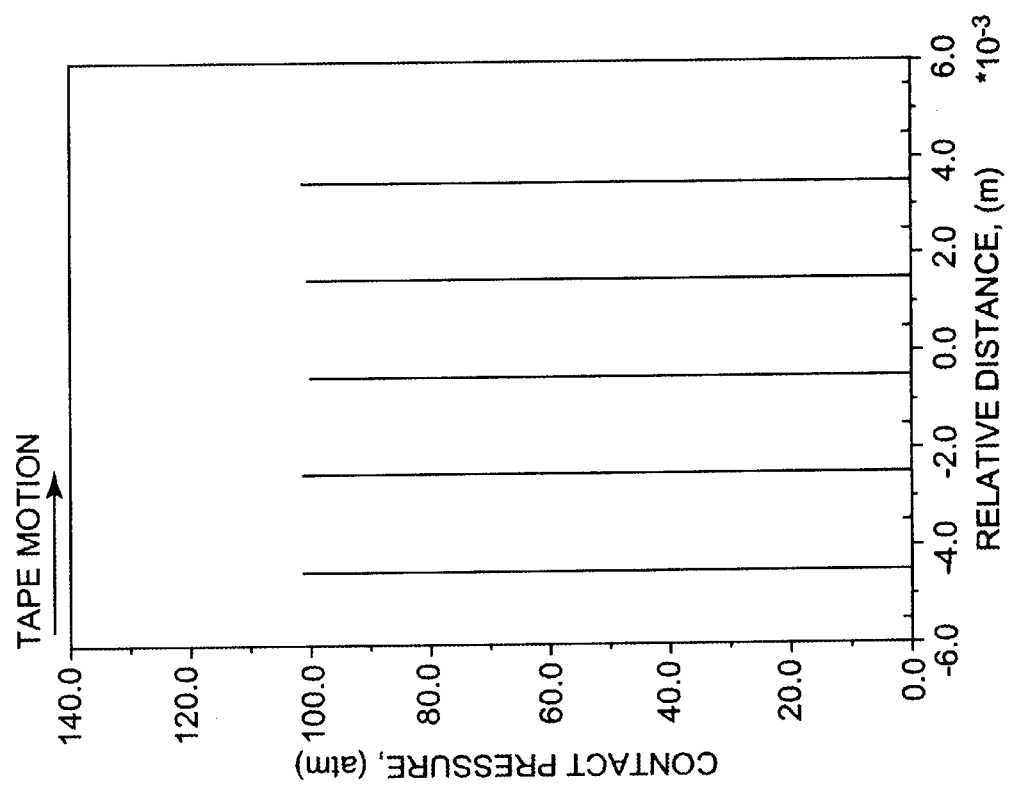
FIG. 10 is a graphical illustration of contact pressure across the width of a central region of the cleaning head of FIG. 7.

The design of the cleaning head 92 in accordance with the present invention is based upon two- and three-dimensional computer simulations of the head-to-tape interface. The results presented below are based on the elastic and surface properties of 18-gauge magnetic tape recording medium available from Imation Corp., of Oakdale, Minn., in conjunction with the cleaning head 92 formed in accordance with the most preferred embodiments described above (e.g., central cavity depth of 2 micron, and width of 1 mm). FIG. 10 illustrates the contact pressure between the magnetic tape 80 and the cleaning head 92 as a function of relative distance across the cleaning head 92. The horizontal axis illustrates the relative distance in the direction of the tape travel in millimeters. Tape travel is from left to right. The center, designated 0.0, is the center of the middle cavity (FIG. 9).

Each of the central cavities 118 has a transverse width of about 1.0 mm on either side of the center. The outer surfaces 120 associated with each of the lands 114 have a transverse width of about 0.8 mm. The vertical axis is the contact pressure in atmospheres. The maximum contact pressure occurs in the transition zones at the leading corners of each of the lands 114, designated by spikes in FIG. 10 as the magnetic tape 80 bends into each of the cavities 118.

Figure 11:
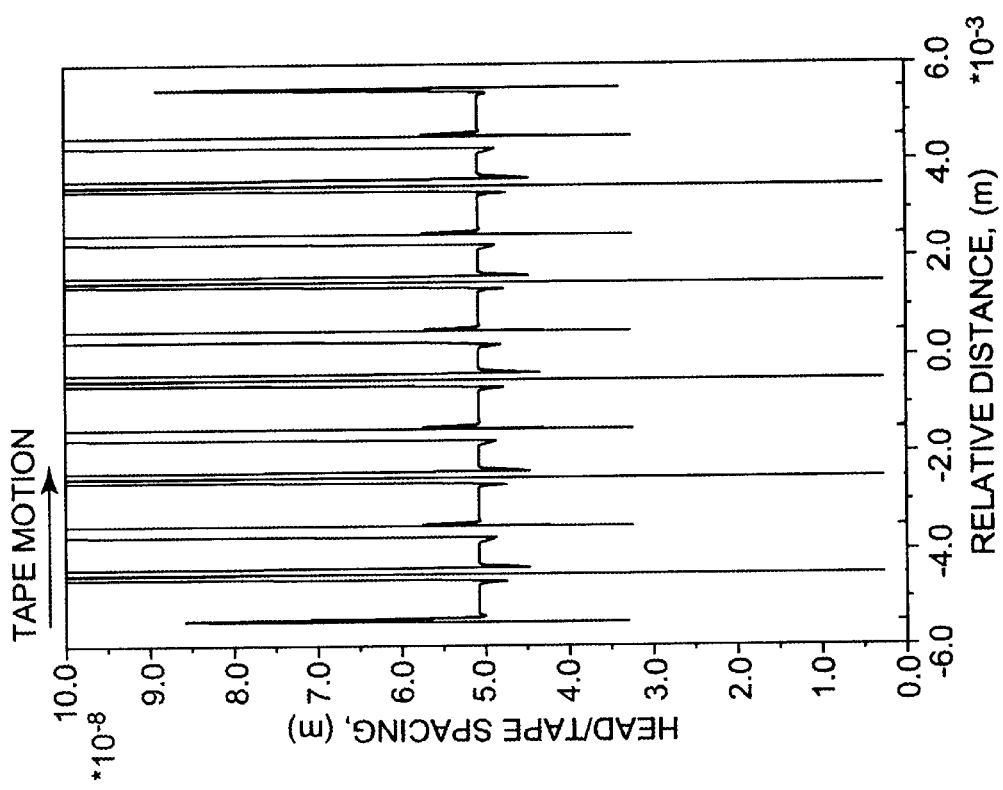
FIG. 11 is a graphical illustration of head-to-tape spacing across the width of a central region of the cleaning head of FIG. 7.

FIG. 11 illustrates the head-to-tape spacing for a magnetic tape as a function of relative distance across the cleaning head 92. The horizontal axis is the same as in FIG. 10. The vertical axis is the distance between the magnetic tape 80 and the cleaning head 92 in $10^{-8}$ meters. The maximum head-to-tape spacing occurs at the leading and trailing ends of the central cavities 118; whereas the minimum head-to-tape spacing occurs at the leading corner 122a of each of the lands 114.

Returning to FIG. 1, the first and second cleaning devices 22, 24 are preferably associated with one another via the support structure 26 for cleaning/finishing tape media (not shown). In this regard, the cleaning system 20 may include additional components (not shown) useful for facilitating processing of the tape. For example, where the cleaning system 20 is used as part of an in-line magnetic tape manufacturing operation, the cleaning system 20 can include a feeding mechanism (not shown) adapted to drive the magnetic tape across the cleaning heads 42, 92, with desired tape penetration of the respective cleaning heads 42, 92 being established by the tape guides 28 and positioning of the respective control blocks 40, 90. Notably, a relative spacing between the first and second cleaning devices 22, 24 may be greater than that illustrated in FIG. 1 for ensuring proper head/tape interface.

While the cleaning heads 42, 92 are each uniquely configured to effectuate removal of debris from the tape (not shown), the type of debris most likely to be removed will vary based upon the respective head design. In particular, the cleaning head 42 associated with the first cleaning device 22 more readily removes relatively large, loosely-adhered debris particles due to the preferably high number of intimate contact points between the magnetic tape and ridges 60 (FIG. 2). Further, relative to data storage applications, by providing a relatively large number of contact points (via the multiple ridges 60), a single pass of a magnetic tape over the first cleaning head 42 simulates multiple passes over a typical magnetic head, such that the first cleaning head 42 readily stabilizes the magnetic tape, especially newly-manufactured magnetic tape. Conversely, the cleaning head 92 associated with the second cleaning device 24 provides a relatively more aggressive head-tape interface, and is thus able to remove tacky or sticky debris that is otherwise more permanently adhered to the magnetic tape. Thus, in a preferred embodiment, the cleaning system 20 is arranged such that a magnetic tape is first passed over the first cleaning device 22 for removal of a majority of loose, relatively large debris, followed by the second cleaning device 24 that removes more permanently adhered debris. Alternatively, however, the cleaning system 20 can consist of only the first cleaning device 22 or only the second cleaning device 24. Conversely, the cleaning system 20 can include two or more of the first cleaning device 22 and/or two or more of the second cleaning device 24.

Figure 12:
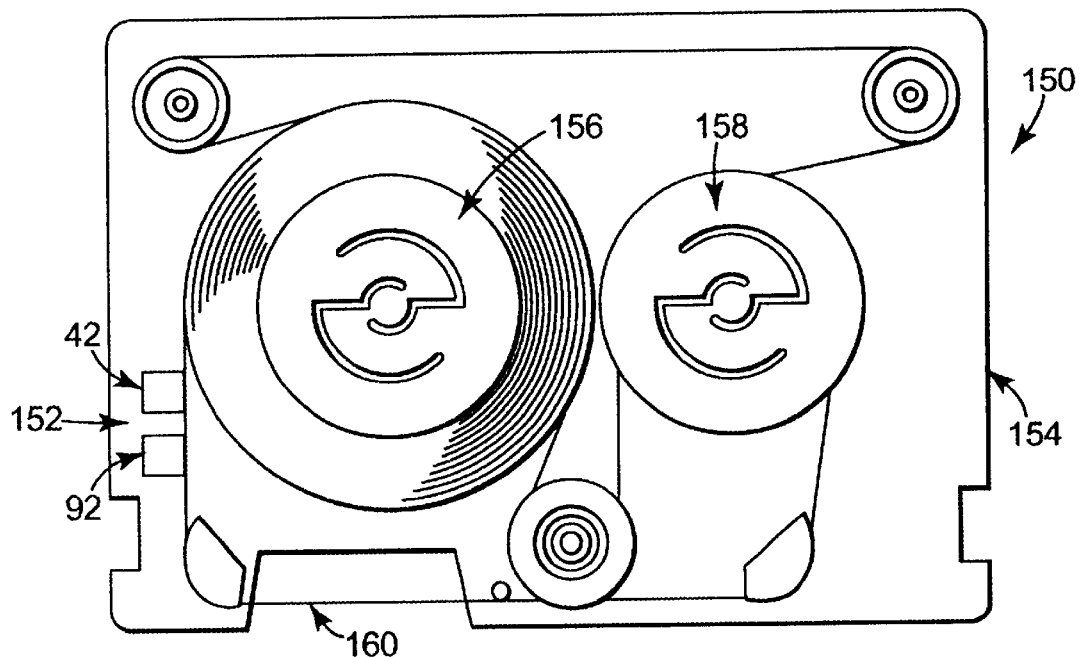
FIG. 12 is an exploded, perspective view of a data storage tape cartridge incorporating a tape cleaning system in accordance with the present invention.

While the cleaning system 20 has been preferably described as being configured for use with in-line cleaning/finishing of tape during the manufacture thereof, other applications are also available. For example, FIG. 12 illustrates a data storage tape cartridge 150 incorporating a cleaning system 152 in accordance with the present invention. In general terms, the data storage tape cartridge 150 includes an enclosure 154 rotatably maintaining tape reel assemblies 156, 158. A magnetic tape 160 is wrapped about, and extends between, the tape reel assemblies 156, 158. The cleaning system 152 is maintained within the enclosure 154 and preferably consists of the cleaning head 42 and the cleaning head 92 previously described. In particular, the cleaning heads 42, 92 are positioned along a tape path defined by the magnetic tape 160. The cleaning heads 42, 92 can be fixed to constantly interact with the magnetic tape 160, or can be mounted to respective control blocks (e.g., the control blocks 40, 90 of FIG. 1) that selectively position the corresponding cleaning head 42, 92 to periodically interface with the magnetic tape 160. Regardless, during use, the data storage tape cartridge 150 is inserted into a tape drive (not shown) that otherwise includes drive chucks (not shown) that engage and rotate the tape reel assemblies 156, 158. As the tape reel assemblies 156, 158 are rotated, the magnetic tape 160 passes over, and interacts with, the cleaning heads 42, 92, effectuating removal of debris from the magnetic tape 160 as previously described. The cleaning system 152 associated with the data storage tape cartridge 150 may include only one of the cleaning heads 42 or 92 and/or can include a plurality of one or both of the cleaning heads 42, 92.

Figure 13:
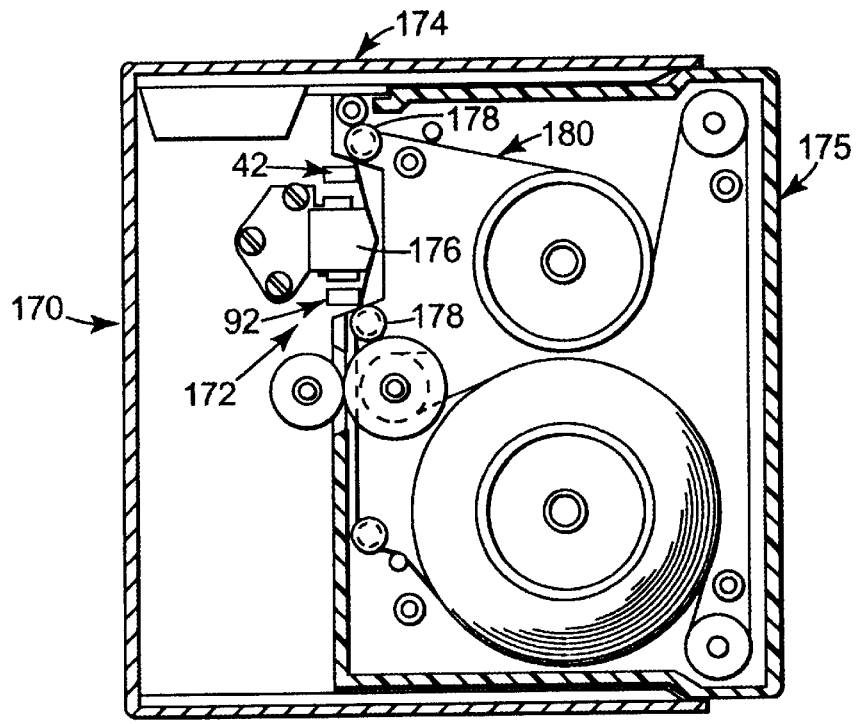
FIG. 13 is a schematic illustration of a tape drive incorporating a tape cleaning system in accordance with the present invention.

Yet another application of the present invention is illustrated in FIG. 13 in which a tape drive 170 (shown schematically) is formed to include a cleaning system 172 in accordance with the present invention. In general terms, the tape drive 170 includes an enclosure 174 sized to receive a data storage tape cartridge 175 and maintaining one or more magnetic heads 176. The tape drive 170 and/or the tape cartridge 175 further includes various tape guides 178 that define a tape path about the magnetic head 176. As shown in FIG. 13, the cleaning system 172 includes the cleaning heads 42, 92 previously described. In particular, the cleaning heads 42, 92 are maintained within the enclosure 174 and are positioned (either permanently or selectively) along the tape path defined by the tape guides 178 and the magnetic head 176. During use, the data storage tape cartridge 175, including a magnetic tape 180, is inserted into the enclosure 174. Appropriate drive mechanisms (not shown) associated with the tape drive 170 are actuated to deliver the magnetic tape 180 to the tape guides 178 and the magnetic head 176. The drive mechanisms may include drive chucks, take-up reels, etc. Regardless, as the magnetic tape 180 is driven through the tape path, the cleaning heads 42, 92 interact with the magnetic tape 180. The cleaning heads 42, 92 can be permanently positioned to consistently contact the magnetic tape 180, or can be mounted to control blocks (not shown) that otherwise selectively dictate a tape penetration position of the corresponding cleaning head 42, 92. Regardless, when properly positioned, the cleaning heads 42, 92 interact with, and remove debris from, the magnetic tape 180. Once again, the cleaning system 172 need only include one of the cleaning heads 42, 92, or can include a plurality of one or both of the cleaning heads 42, 92.

The cleaning system of the present invention provides a marked improvement over previous designs. The inefficiencies and unknown effects of prior art sapphire scraping or fabric wiping techniques are eliminated by providing precisely formed cleaning heads that serve to not only remove a wide variety of debris, but also simulate multiple passes over a device (e.g., magnetic head) for which the tape is intended. In this regard, one embodiment of the cleaning system includes a cleaning head forming a plurality of slots configured to uniformly guide the tape over a plurality of sharp edges. In a second embodiment, the cleaning system includes a cleaning head forming shallow cavities that establish a sub-ambient condition, thereby effectuating intimate, high-pressure contact. The cleaning system can be employed at a number of locations, including in-line magnetic tape manufacturing, within a cartridge or within a tape drive.

Although the present invention has been described with respect to preferred embodiments, workers skilled in the art will recognize that changes can be made in form and detail without departing from the spirit and scope of the present invention.

What is claimed is:

1. A tape media cleaning device comprising:
    a head having a front;
    a plurality of transverse slots formed in the front to define a plurality of spaced ridges each having an outer surface extending between opposing transverse edges;
    wherein the outer surfaces combine to define a curved, tape-receiving face configured such that a tape driven along the tape-receiving face in a generally perpendicular fashion relative to the transverse edges contacts a leading transverse edge of at least three of the ridges to effectuate removal of debris.

2. The cleaning device of claim 1, wherein the head includes at least ten of the transverse slots.

3. The cleaning device of claim 1, wherein each ridge further includes opposing side walls, and further wherein at least one of the opposing edges for each of the plurality of slots is a corner defined by an intersection between the outer surface and respective side wall.

4. The cleaning device of claim 1, wherein the outer surfaces combine to define a uniform radius of curvature.

5. The cleaning device of claim 4, wherein the radius of curvature is at least 5 mm.

6. The cleaning device of claim 5, wherein the radius of curvature is not greater than 20 mm.

7. The cleaning device of claim 1, further comprising:
    a data storage tape cartridge including an enclosure and a storage tape wrapped about a tape reel assembly;
    wherein the cleaning head is disposed within the enclosure and positioned to selectively engage the storage tape.

8. The cleaning device of claim 1, further comprising:
    a tape drive including an enclosure configured to receive a data storage tape cartridge;
    wherein the head is disposed within the enclosure.

9. The cleaning device of claim 1, further comprising:
    a feeding mechanism associated with the head and configured to drive a magnetic tape across the tape-receiving face as part of a magnetic tape manufacturing process.

10. A method of removing debris from a tape media, the method comprising:
    providing a cleaning head having a front and a plurality of transverse slots formed in the front to define a plurality of spaced ridges each having an outer surface extending between opposing transverse edges, the outer surfaces combining to define a curved, tape-receiving face;
    driving the tape across the face in a generally perpendicular fashion relative to the transverse edges such that a transverse chordal segment of the tape contacts a leading transverse edge of at least three of the ridges as the tape is driven across the face; and
    removing debris from the tape via the driven contact between the tape and the leading transverse edges.

11. The method of claim 10, wherein the cleaning head includes at least ten of the ridges, and further wherein the step of driving the tape includes causing the transverse chordal segment to contact a leading transverse edge of at least ten of the ridges.

12. The method of claim 10, wherein the outer surfaces combine to define a radius of curvature in the range of 5–20 mm.

13. A tape media cleaning device comprising:
    a head having a front defined by opposing outer regions and a central region;
    a plurality of transverse cavities formed in the front to define a plurality of lands in the central region each having a flat outer face extending between opposing sides with opposing corners being formed at an intersection between the outer face and the opposing sides, respectively; and
    first and second outriggers formed at the opposing outer regions, respectively, wherein each of the outriggers are spaced from a corresponding, adjacent land;
    wherein the plurality of cavities are configured to establish a sub-ambient condition as a tape is driven across the outer faces in a generally perpendicular fashion relative to the lands such that the tape at least partially wraps about a leading corner of at least three of the lands to effectuate removal of debris.

14. The cleaning device of claim 13, wherein the head includes at least four of the lands.

15. The cleaning device of claim 13, wherein the plurality of cavities include opposing outer cavities separating the respective outriggers from an adjacent one of the lands and central cavities separating the lands in the central region, and further wherein the central cavities are uniformly formed.

16. The cleaning device of claim 15, wherein each of the central cavities has a depth in the range of 1–10 microns.

17. The cleaning device of claim 16, wherein the depth of each of the central cavities is in the range of 1.5–2.5 microns.

18. The cleaning device of claim 15, wherein a depth of the outer cavities is greater than a depth of the central cavities.

19. A method of removing debris from a tape media, the method comprising:
    providing a cleaning head having a front defined by opposing outer regions and a central region, a plurality of transverse cavities formed in the front to define a plurality of lands in the central region, each of the lands having a flat outer face extending between opposing corners, and opposing outriggers formed at the opposing outer regions, respectively;
    driving the tape across the outer faces in a generally perpendicular fashion relative to the lands such that a transverse chordal segment of the tape is passed over at least three of the lands;
    establishing a sub-ambient condition within at least three of the cavities during the step of driving the tape such that the magnetic tape at least partially wraps about a leading corner of at least three of the lands; and
    removing debris from the tape via driven contact between the tape and a leading corner about which the tape is at least partially wrapped.

20. A tape media cleaning system comprising:
    a first cleaning device comprising:
        a first head having a front;

a plurality of transverse slots formed in the front to define a plurality of spaced ridges each having an outer surface extending between opposing transverse edges;
   wherein the outer surfaces combine to define a curved, tape-receiving face configured such that a tape driven along the tape-receiving face in a generally perpendicular fashion relative to the transverse edges contacts a leading transverse edge of at least three of the ridges to effectuate removal of debris; and
 a second cleaning device associated with the first cleaning device, the second cleaning device comprising:
   a second head having a front defined by opposing outer regions and a central region;
   a plurality of transverse cavities formed in the front of the second head to define a plurality of lands in the central region each having flat outer face extending between opposing sides with opposing corners being formed at an intersection between the outer face and the opposing sides, respectively; and
   first and second outriggers formed at the opposing outer regions, respectively, wherein each of the outriggers are spaced from a corresponding, adjacent land;
   wherein the plurality of cavities are configured to establish a sub-ambient condition as a tape is driven across the outer faces in a generally perpendicular fashion relative to the lands such that the tape at least partially wraps about a leading corner of at least three of the lands to effectuate removal of debris.

21. The cleaning system of claim 20, wherein the first head includes at least ten of the transverse slots.

22. The cleaning system of claim 20, wherein the second head includes at least four of the lands.

23. A method of removing debris from a tape media, the method comprising:

providing a first cleaning head having a front and a plurality of transverse slots formed in the front to define a plurality of spaced ridges each having an outer surface extending between opposing transverse edges, the outer surfaces combining to define a curved, tape-receiving face;
   providing a second cleaning head having a front defined by opposing outer regions and a central region, a plurality of transverse cavities formed in the front to define a plurality of lands in the central region, each of the lands having a flat outer face extending between opposing corners, and opposing outriggers formed at the opposing outer regions, respectively;
   driving the tape across the tape-receiving surface of the first cleaning head and the outer faces of the lands of the second cleaning head such that a transverse chordal segment of the tape contacts a leading transverse edge of at least three of the ridges of the first cleaning head and is passed over at least three of the lands of the second cleaning head;
   establishing a sub-ambient condition within at least three of the cavities of the second cleaning head during the step of driving the tape such that the tape at least partially wraps about a leading corner of at least three of the lands of the second cleaning head; and
   removing debris from the tape via driven contact between the tape and the leading transverse edges of the first cleaning head and between the tape and a leading corner about which the tape is at least partially wrapped of the second cleaning head.

24. The method of claim 23, wherein the step of driving the tape includes causing the tape to first contact the first cleaning head, and then contact the second cleaning head.

\* \* \* \* \*